US009683655B2

(12) United States Patent
Ishino et al.

(10) Patent No.: US 9,683,655 B2
(45) Date of Patent: Jun. 20, 2017

(54) SHIFT DEVICE FOR VEHICLE

(71) Applicant: HONDA MOTOR CO., LTD., Minato-Ku, Tokyo (JP)

(72) Inventors: Toru Ishino, Wako (JP); Osamu Mihashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 329 days.

(21) Appl. No.: 14/405,838

(22) PCT Filed: May 29, 2013

(86) PCT No.: PCT/JP2013/064873
§ 371 (c)(1),
(2) Date: Dec. 5, 2014

(87) PCT Pub. No.: WO2013/183513
PCT Pub. Date: Dec. 12, 2013

(65) Prior Publication Data
US 2015/0176699 A1    Jun. 25, 2015

(30) Foreign Application Priority Data
Jun. 8, 2012 (JP) ................. 2012-130914

(51) Int. Cl.
*F16H 59/12*     (2006.01)
*F16H 61/18*     (2006.01)
*F16H 59/02*     (2006.01)

(52) U.S. Cl.
CPC ....... *F16H 59/12* (2013.01); *F16H 2059/026* (2013.01); *F16H 2061/185* (2013.01); *Y10T 74/2014* (2015.01)

(58) Field of Classification Search
CPC ...................... F16H 2059/026; F16H 2061/185
See application file for complete search history.

(56) References Cited

U.S. PATENT DOCUMENTS 5,161,422 A * 11/1992 Suman ................... B60K 20/04
                                                        180/315
6,145,401 A    11/2000 Brush et al.
(Continued)

FOREIGN PATENT DOCUMENTS

JP    H09-264408 A    10/1997
JP    2002-248959 A    9/2002
(Continued)

OTHER PUBLICATIONS

Office Action dated Dec. 3, 2015 regarding the corresponding Canadian Patent Application No. 2,875,921.
(Continued)

*Primary Examiner* — David M Fenstermacher
(74) *Attorney, Agent, or Firm* — Carrier Blackman & Associates, P.C.; Joseph P. Carrier; Jeffrey T. Gedeon (57) ABSTRACT

A shift device for a vehicle has a D-switch operation unit corresponding to a drive range, an N-switch operation unit corresponding to a neutral range, an R-switch operation unit corresponding to a reverse range, and a P-switch operation unit corresponding to a parking range. The R-switch operation unit is operated toward the back in the front-back direction of the vehicle to select the reverse range, and the switch operation units other than the R-switch operation unit are pressed downward from above to select respective ranges. The direction of operation of the R-switch operation unit is set to differ from the directions of operation of the other switch operation units when selecting a range other than the reverse range.

15 Claims, 5 Drawing Sheets

(56) References Cited

U.S. PATENT DOCUMENTS

| | | | |
|---|---|---|---|
| 6,848,332 B2 | 2/2005 | Hayashi et al. | |
| 6,904,822 B2* | 6/2005 | Meyer | F16H 59/0204 74/335 |
| 7,204,338 B2* | 4/2007 | Katae | B60L 1/003 180/315 |
| 8,359,943 B2* | 1/2013 | Seki | B60K 37/06 74/473.21 |
| 9,021,911 B2* | 5/2015 | Kim | F16H 59/105 74/473.12 |
| 9,140,353 B2* | 9/2015 | Meyer | B60K 37/06 |
| 9,291,259 B2* | 3/2016 | Watanabe | F16H 59/08 |
| 9,487,241 B2* | 11/2016 | Iriguchi | B60K 37/06 |
| 2002/0152827 A1 | 10/2002 | Hayashi et al. | |
| 2007/0018493 A1 | 1/2007 | Kawachi et al. | |
| 2015/0068343 A1* | 3/2015 | Tokumo | F16H 61/0213 74/473.12 |

FOREIGN PATENT DOCUMENTS

| | | |
|---|---|---|
| JP | 2002-254950 A | 9/2002 |
| JP | 2006-160098 A | 6/2006 |
| JP | 2006-240330 A | 9/2006 |
| JP | 2012-071649 A | 4/2012 |

OTHER PUBLICATIONS

Notice of Reasons for Refusal dated Oct. 20, 2015 from JPO in regards to Japanese Patent Application No. 2014-519947.

* cited by examiner

SHIFT DEVICE FOR VEHICLE

TECHNICAL FIELD

The present invention relates to a shift device for a vehicle, which has as a travel range of the vehicle, at least a drive range, a neutral range and a reverse range, and is provided to enable each range to be switched based on operation of switch operation units by a driver.

BACKGROUND ART

Heretofore, there is known a technique of operating a shift lever of a shift device to switch the gearshift position of an automatic transmission mounted on a vehicle. As this kind of shift device, for example, Patent Literature 1 discloses a shift operation body with which shift operation is performed using four push switches arranged on the surface of a base body to thereby switch the connection state of a transmission.

Moreover, Patent Literature 2 discloses a gearshift device with which a plurality of gearshift switches comprised of push-button switches are properly selected to switch the gearshift position of an automatic transmission when the operation lever is changed to its collapsed position to set to the automatic gearshift mode.

CITATION LIST

Patent Literature

Patent Literature 1: Japanese Patent Application Publication No. 2002-248959
Patent Literature 2: Japanese Patent Application Publication No. 2006-160098

SUMMARY OF THE INVENTION

Technical Problem

Incidentally, the four push switches disclosed in Patent Literature 1 are arranged on a flat surface of the base body to be spaced from one another at positions in four directions which form vertices of a rhombus. Moreover, the plurality of gearshift switches (push-button switches) disclosed in Patent Literature 2 are arranged linearly and adjacently in the order of reverse (R), neutral (N) and drive (D) from the upper side of the operation lever.

In a conventional shift device that selects a shift position depending on the relationship of positions between a gate trench and an operation lever, the operation lever needs to be moved along the gate trench from the current shift position in order to select a desired shift position. Accordingly, in the conventional shift device, a possibility of wrongly selecting a shift position quite different from a behavior of the vehicle intended by a driver is low.

Generally, in the gate trench, the shift positions are arranged linearly along the gate trench in the order of parking (P), reverse (R), neutral (N) and drive (D). Accordingly, when the operation lever is currently at the N-position and the D-position is selected, a possibility of wrongly selecting the R-position for which the direction of operation is in an opposite direction to that for the D-position becomes low.

However, in the case where each shift position is configured with a single push switch (push-button switch), such as described in Patent Literature 1 or Patent Literature 2, there is a possibility that a driver wrongly operates (presses) an unintended push switch (push-button switch) to impair comfort and operability.

In particular, in a shift operation of a vehicle, it is also conceived that a driver operates without looking at the shift position (displaced position) of the operation lever, i.e., performs a so-called blind operation. Accordingly, when such a blind operation is performed with the push switches (push-button switches) disclosed in Patent Literature 1 or Patent Literature 2, there is a possibility that a driver pushes a wrong switch to select a shift position different from an intended one to thereby impair comfort and operability.

The present invention has been made in view of the above problems and an object thereof is to provide a shift device for a vehicle, which enables operation of switch operation units to be performed favorably even if a blind operation is performed.

Solution to Problem

In order to attain the above object, the present invention provides a shift device for a vehicle, having as a travel range of the vehicle, at least a drive range, a neutral range and a reverse range, and provided to enable each range to be switched based on operation of switch operation units by a driver, wherein the switch operation units includes: a D-switch operation unit corresponding to the drive range; an N-switch operation unit corresponding to the neutral range; and an R-switch operation unit corresponding to the reverse range, and each of the switch operation units is provided so that a direction of operation of the R-switch operation unit when selecting the reverse range differs from directions of operation of other switch operation units when selecting a range other than the reverse range.

Generally, in a shift operation of a vehicle, the vehicle travels in the backward direction only when the reverse range is selected. According to the present invention, each of the switch operation units is provided so that the direction of operation of the R-switch operation unit corresponding to the reverse range is set to be a direction different from the directions of operation of the other switch operation units when selecting a range other than the reverse range. Accordingly, when the driver intends to select, for example, the drive range or the neutral range, even if the driver attempts to wrongly operate the R-switch operation unit (to operate the N-switch operation unit or the D-switch operation unit), the R-switch operation unit can be suppressed from being operated because the direction of operation thereof differs from that of the N-switch operation unit or the D-switch operation unit.

Consequently, according to the present invention, even if the driver performs a blind operation, the driver can easily recognize from the difference between the directions of operation whether or not the R-switch operation unit is operated, thereby making it possible to suppress disadvantage in that the driver wrongly selects the reverse range to impair comfort and operability.

Moreover, the shift device of the present invention may be configured such that each of the switch operation units is provided so that the direction of operation of the R-switch operation unit when selecting the reverse range is set to be in a direction nearly perpendicular to the directions of operation of other switch operation units when selecting a range other than the reverse range, or so that each other's directions of operation intersect such that an angle between the each other's directions of operation is a right angle or more.

According to the present invention, in order for the driver to perform operation of the R-switch operation unit, the operation is performed in a direction nearly perpendicular to the directions of operation when operating the other switch operation units, or with a different angle of a right angle or more relative to the directions of operation of the other switch operation units. Accordingly, for example, at a time of blind operation, even if the driver attempts to operate the R-switch operation unit in the directions of operation corresponding to the other switch operation units with an intention to operate the other switch operation units, the R-switch operation unit cannot be operated and thus operability can be further improved.

Furthermore, the shift device of the present invention may be configured such that the R-switch operation unit is operated toward a back in a front-back direction of the vehicle to select the reverse range.

According to the present invention, since the R-switch operation unit is operated toward the back in the front-back direction of the vehicle to select the reverse range, a direction of behavior (backward travel direction) of the vehicle intended by the driver becomes identical to the direction of operation of the R-switch operation unit, thereby making it possible for the driver to operate intuitively and thus to improve the operability.

Furthermore, the shift device of the present invention may be configured such that the directions of operation of the other switch operation units when selecting a range other than the reverse range are in a direction away from the driver, and the direction of operation of the R-switch operation unit is in a direction toward the driver side.

According to the present invention, even in the case where the driver, for example, performs a blind operation or wrongly touches the shift device, the driver is free from experiencing discomfort feeling because the R-switch operation unit is not operated at all.

Furthermore, the shift device of the present invention may be configured such that the shift device further includes a panel face which is arranged on a vehicle body and on which each of the switch operation units is arranged, and in the panel face, a face on which the R-switch operation unit is arranged, and a face on which the D-switch operation unit is arranged, are arranged toward directions facing each other and slope relative to a face on which the N-switch operation unit is arranged.

According to the present invention, the face on which the R-switch operation unit is arranged, and the face on which the D-switch operation unit is arranged, are arranged stepping over the N-switch operation unit, toward the directions facing each other. Moreover, the face on which the R-switch operation unit is arranged, and the face on which the D-switch operation unit is arranged, slope relative to the face on which the N-switch operation unit is arranged. Accordingly, the driver never wrongly presses the R-switch operation unit and the D-switch operation unit and thus the operability can be improved.

Furthermore, the shift device of the present invention may be configured such that the shift device further includes a panel face which is arranged on a vehicle body and on which each of the switch operation units is arranged, and the other switch operation units when selecting a range other than the reverse range are arranged on a surface of the panel face; the panel face has a recessed portion which is recessed from the surface toward the inside; and the R-switch operation unit is arranged in a step portion between a bottom surface forming the recessed portion and the surface.

According to the present invention, the driver needs to put a hand in the recessed portion and further in this state to operate the R-switch operation unit. Accordingly, even in the case where the driver wrongly touches the shift device, the driver is free from experiencing discomfort feeling because only the touch with the bottom surface of the recessed portion does not cause the R-switch operation unit to be operated.

Furthermore, the shift device of the present invention may be configured such that each of the switch operation units is constituted by a push button; the switch operation units further includes a P-switch operation unit corresponding to a parking range; the P-switch operation unit, the R-switch operation unit, the N-switch operation unit and the D-switch operation unit are arranged in this order on the panel face along a front-back direction of the vehicle; the step portion is provided on the N-switch operation unit side of the recessed portion; and the recessed portion has a sloped face which slopes from the P-switch operation unit toward the R-switch operation unit.

According to the present invention, since the switch operation units are arranged in the order of P, R, N and D to thereby make the shift positions the same as those in a conventional lever-type shift device, the driver can easily grasp the arrangement (positional relationship) of the switch operation units. Moreover, in the present invention, since the sloped face toward the R-switch operation unit is provided, for example, at a time of blind operation, the driver puts a finger in the recessed portion to move the hand along the sloped face to the R-switch operation unit side, thereby allowing the finger to be guided to the R-switch operation unit. Thus, the driver can easily grasp the position of the R-switch operation unit with the recessed portion as a reference and simply operate the R-switch operation unit with the sloped face as a guide face. Accordingly, the shift device excels in its operability.

Furthermore, the shift device of the present invention may be configured such that an operation face of the R-switch operation unit when selecting the reverse range is provided on a longitudinal wall of the push button, which faces the sloped face, and when the panel face is viewed in section, the operation face is set to be in a direction in which a distance from a virtual vertical plane in contact with an upside ridge line of the longitudinal wall gradually increases from an upside of the longitudinal wall toward a downside thereof.

According to the present invention, the operation face is set to be in a direction in which the distance from the virtual vertical plane in contact with the upside ridge line of the longitudinal wall gradually increases from the upside of the longitudinal wall toward the downside thereof, and accordingly, when the panel face is viewed in front, the upside ridge line of the longitudinal wall becomes an obstacle (hindrance) to make it difficult to have visual contact with the operation face. In other words, when the panel face on which each of the switch operation units is arranged is viewed from the front, the operation face of the R-switch operation unit is arranged in a direction hidden from view. Consequently, for example, at a time of blind operation or at a time of unintended touch with the shift device, the driver is free from experiencing discomfort feeling because the R-switch operation unit is not wrongly operated.

Advantageous Effects of the Invention

According to the present invention, a shift device for a vehicle can be obtained that allows operation of switch operation units to be performed favorably even if a blind operation is performed.

DESCRIPTION OF EMBODIMENTS

Figure 1:
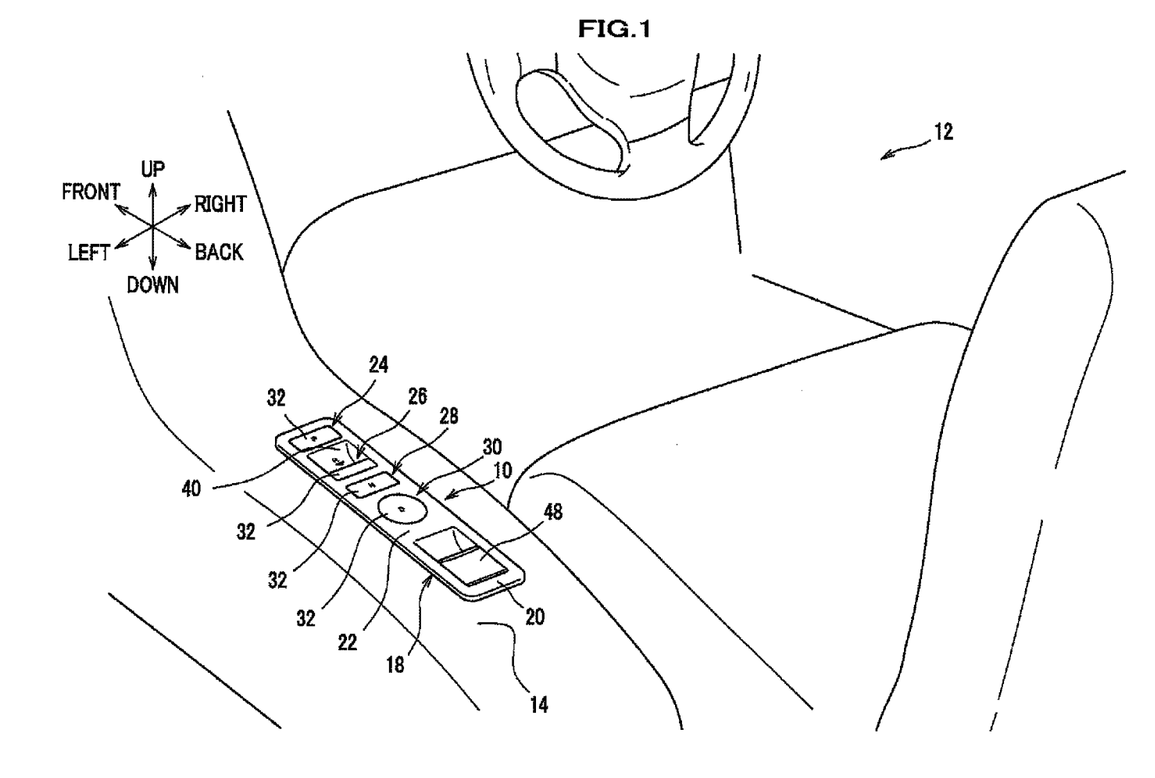
FIG. 1 is a perspective view illustrating a state in which a shift device according to an embodiment of the present invention is arranged on a center console in the middle of a vehicle.
Figure 2:
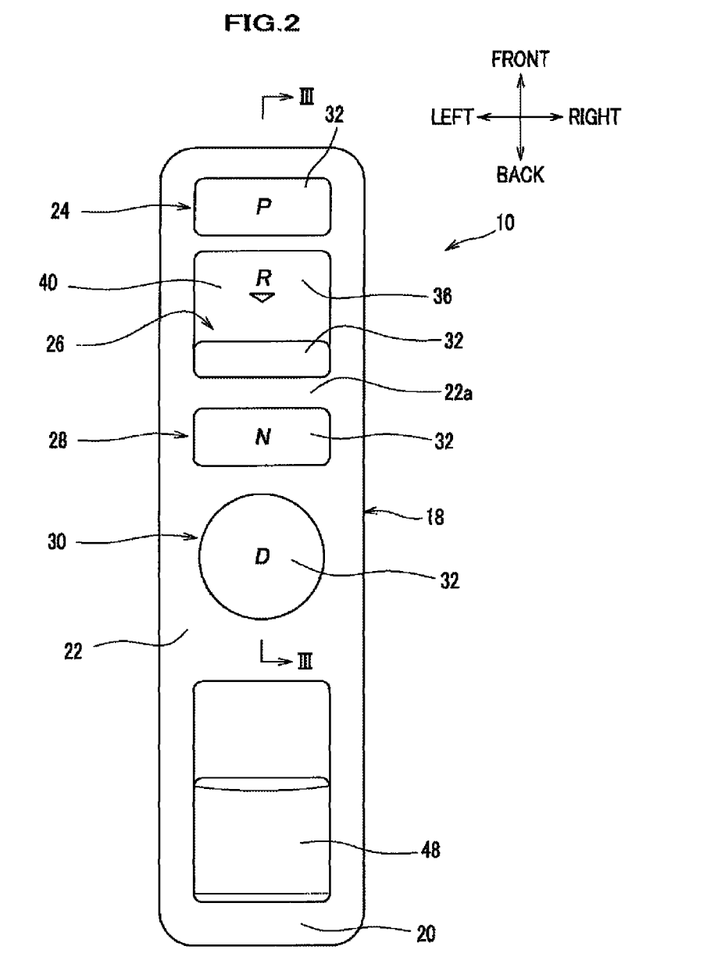
FIG. 2 is a plan view of the shift device illustrated in FIG. 1.

Hereinafter, an embodiment of the present invention will be described in detail with reference to the drawings as appropriate. FIG. 1 is a perspective view illustrating a state in which a shift device according to an embodiment of the present invention is arranged on a center console in a vehicle, and FIG. 2 is a plan view of the shift device illustrated in FIG. 1. Note that in the figures, "front-back", "right-left", and "up-down" indicate a front-back direction of the vehicle, a width direction of the vehicle (right-left direction when viewed from a driver), and an up-down direction of the vehicle, respectively.

The shift device 10 according to an embodiment of the present invention has a function of changing travel ranges of an automatic transmission (not shown) mounted on the vehicle 12, and as shown in FIG. 1, is arranged on a top surface of the center console 14 which is located in the middle of the vehicle 12 between the driver's seat and the front passenger seat to extend along the front-back direction of the vehicle 12. Note that in the present embodiment, a description will be given below, by way of example, of the case where the shift device 10 is arranged on the center console 14, but not limited to this case, for example, the shift device 10 can be arranged at a place to which access is easy for the driver, such as at the downside nearly in the middle of an instrument panel.

As illustrated in FIG. 2, the shift device 10 includes a casing 18 fixed to the center console 14, and a cover member 20 attached to the casing 18. Provided on a panel face 22 which is a top face of the cover member 20, are a P-switch operation unit 24, an R-switch operation unit 26, an N-switch operation unit 28 and a D-switch operation unit 30 in this order linearly from the front of the vehicle 12 toward the back thereof, respectively. The casing 18 and the cover member 20 can be formed of, for example, resin material.

In this case, the P-switch operation unit 24 corresponds to a P-range which is a parking range, the R-switch operation unit 26 corresponds to an R-range which is a reverse range, the N-switch operation unit 28 corresponds to an N-range which is a neutral range, and the D-switch operation unit 30 corresponds to a D-range which is a drive range.

The P-switch operation unit 24, the R-switch operation unit 26, the N-switch operation unit 28 and the D-switch operation unit 30 each have a push button 32 of a shape different from one another when viewed in planar (see FIG. 2). Each of the switch operation units 24, 26, 28 and 30 is constituted as a momentary action switch which is turned on only when the driver presses the push button 32. The push button 32 pressed is provided to return to its original position by a spring force of a return spring 34 (see FIG. 4). Note that in FIG. 3, an arrow mark F indicates a pressed force given by pressing the push button 32.

Referring back to FIG. 2, an English character of "P" is incused on a top face of the push button 32 of the P-switch operation unit 24; an English character of "N" is incused on a top face of the push button 32 of the N-switch operation unit 28; and an English character of "D" is incused on a top face of the push button 32 of the D-switch operation unit 30. Moreover, an English character of "R" and a figure of a triangle positioned below the English character "R" and having a vertex toward the back of the vehicle 12 are incused, respectively, on a sloped face 36 provided on the front side of the vehicle 12, of the push button 32 of the R-switch operation unit 26. Note that the English characters and the figure are not limited to the incuse. For example, an English character and/or a figure may be printed on the top face of the push button 32, or a sheet member on which an English character and/or a figure are described may be attached. Namely, some sort of marking has only to be given to the push button 32.

Figure 4:
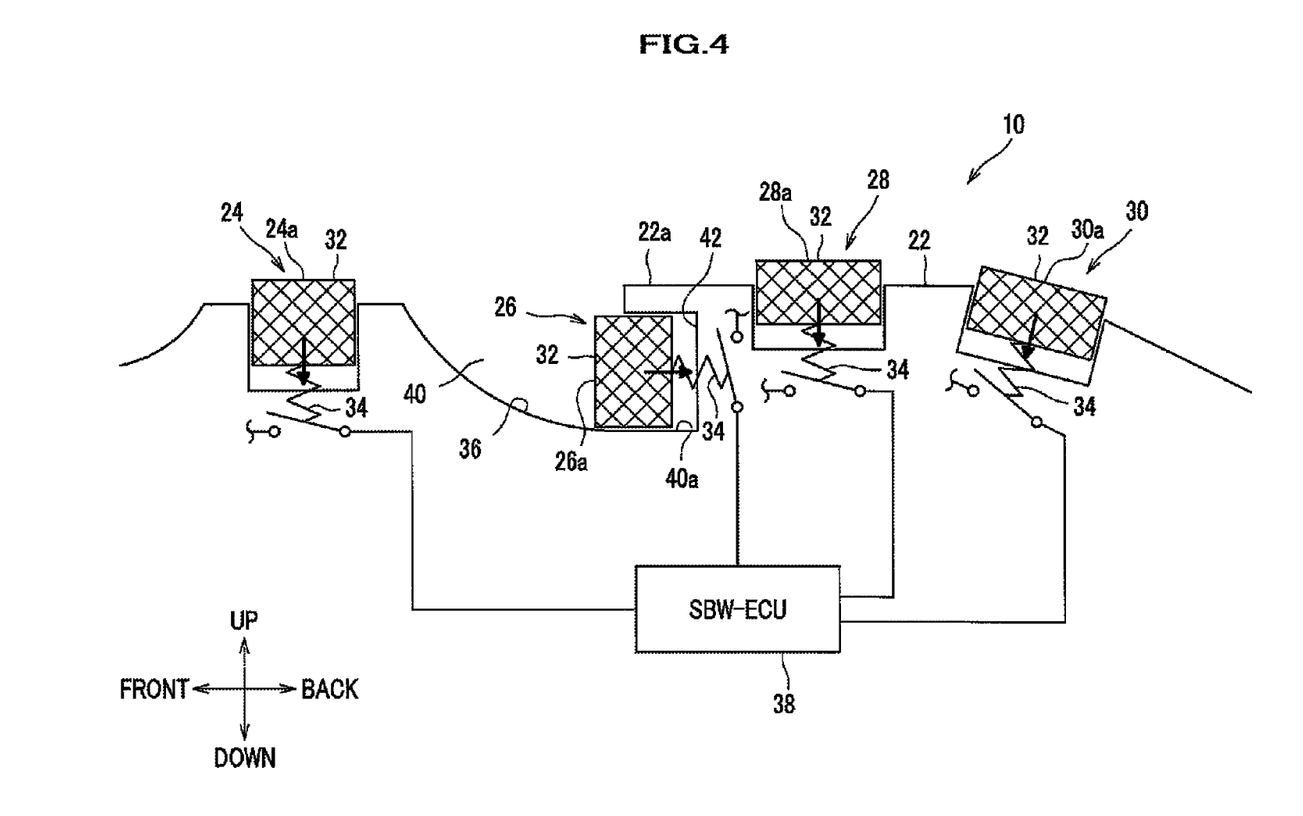
FIG. 4 is a schematic view illustrating the direction of operation of each switch operation unit.

Each of the switch operation units 24, 26, 28 and 30 is electrically connected to an SBW-ECU 38 which is a control device for a transmission (see FIG. 4). The push button 32 of each of the switch operation units 24, 26, 28 and 30 is pressed to output an electric signal to the SBW-ECU 38. The SBW-ECU 38 performs a known automatic gear change control by which connection states in a gear train provided in an automatic transmission (not shown) are sequentially switched among a plurality of steps having different gear ratios. Herein, SBW is an abbreviation of Shift-By-Wire.

Note that, electrically connected to the SBW-ECU 38 are a hydraulic actuator (not shown) that switches the connection states in the gear train, a range position detector (not shown) that detects a range position, an indicator (not shown) that displays a shift position (switch operation unit of which the push button 32 is pressed at the present moment). Moreover, the SBW-ECU 38 includes a microcomputer (not shown) and according to programs stored in a memory in advance, the microcomputer controls the hydraulic actuator (not shown).

Figure 3:
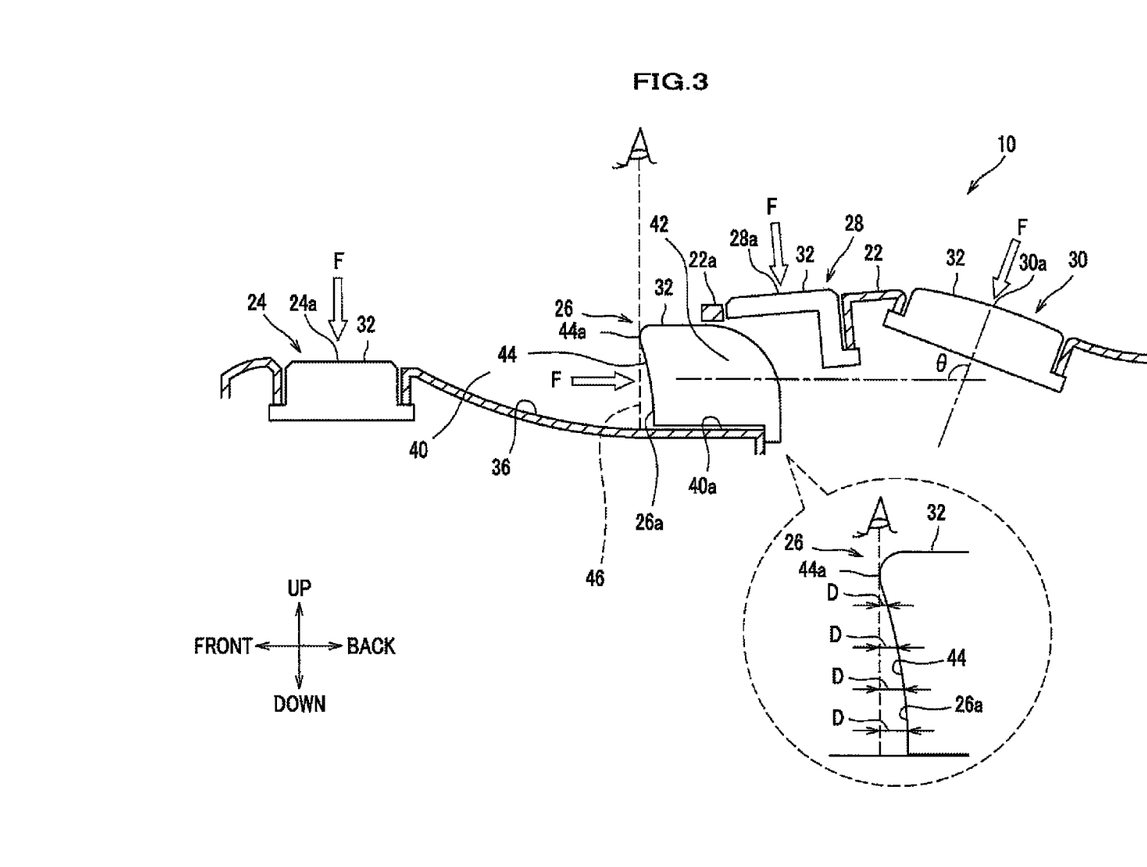
FIG. 3 is an end view taken along the III-III line in FIG. 2.

FIG. 4 is a schematic view illustrating the direction of operation of each switch operation unit. As illustrated in FIG. 3 and FIG. 4, in each of the switch operation units 24, 26, 28 and 30, a direction of operation of the R-switch operation unit 26 when selecting the reverse range is set to differ from directions of operation of other switch operation units 24, 28 and 30 when selecting a range (e.g., P-range, N-range, D-range) other than the reverse range.

To be more specific, the P-switch operation unit 24, the N switch operation unit 28 and the D-switch operation unit 30 are set to be in a direction of operation in which the driver presses the push button 32 downward from above. Unlike this, the R-switch operation unit 26 is set to be in a direction of operation in which the push button 32 is pressed in a direction nearly perpendicular to the direction of operation described above.

In other words, the R-switch operation unit 26 is not activated even if the push button 32 is pressed downward from above, and the push button 32 is pressed (operated) toward the back in the front-back direction of the vehicle 12 to select the reverse range. Unlike this, as for the other switch operation units (P, N, D) 24, 28 and 30 except for the R-switch operation unit 26, the push button 32 is pressed (operated) downward from above of the vehicle 12 to select a desired each range (P-range, N-range, D-range), respectively.

In this case, the direction of operation of the R-switch operation unit 26 and the directions of operation of the other switch operation units (P, N, D) 24, 28 and 30 except for the R-switch operation unit 26 are set to be in directions nearly perpendicular to each other, or set to intersect such that an angle between the each other's directions of operation is a right angle or more.

More specifically, the direction of operation of the R-switch operation unit 26 and the directions of operation of the P-switch operation unit 24 and the N switch operation unit 28 are set to be in directions nearly perpendicular to each other. Moreover, the directions of operation of the R-switch operation unit 26 and the D-switch operation unit 30 are set to intersect such that the angle θ (see FIG. 3) between the each other's directions of operation is a right angle or more.

Moreover, the direction of operation of the R-switch operation unit 26 is set to be in a direction from the center console 14 toward the driver side (direction to pull in toward the driver side), and on the other hand, the directions of operation of the other switch operation units 24, 28 and 30 except for the R-switch operation unit 26 are set to be in a direction in which the push button 32 is pressed toward the downside of the vehicle body to be in a direction away from the driver (direction to separate from the driver).

The description has been given to the case where the direction of operation of the R-switch operation unit 26 is set to differ from the directions of operation of the other switch operation units 24, 28 and 30, but, for example, a spring force of the return spring 34 (see FIG. 4) may be adjusted to set a pressed force to be given to the push button 32 of the R-switch operation unit 26 and a pressed force to be given to the push button 32 of the P-switch operation unit 24, the N switch operation unit 28 and the D-switch operation unit 30 to be different from each other to attain differentiation of operations.

Figure 5A:
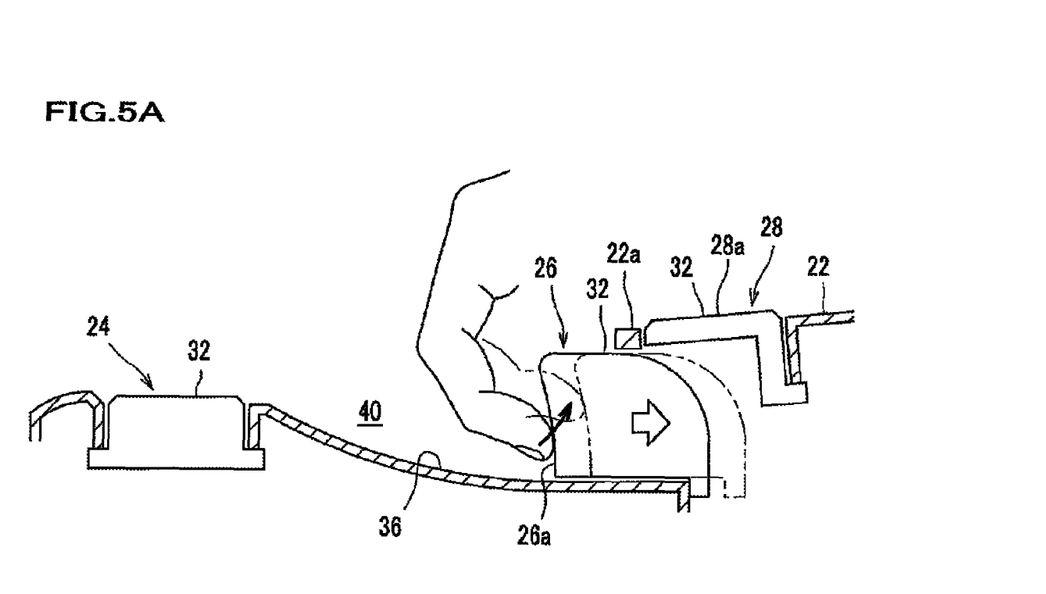
FIG. 5A is an explanatory view illustrating a state in which an operation face of an R-switch operation unit is pressed with a finger.
Figure 5B:
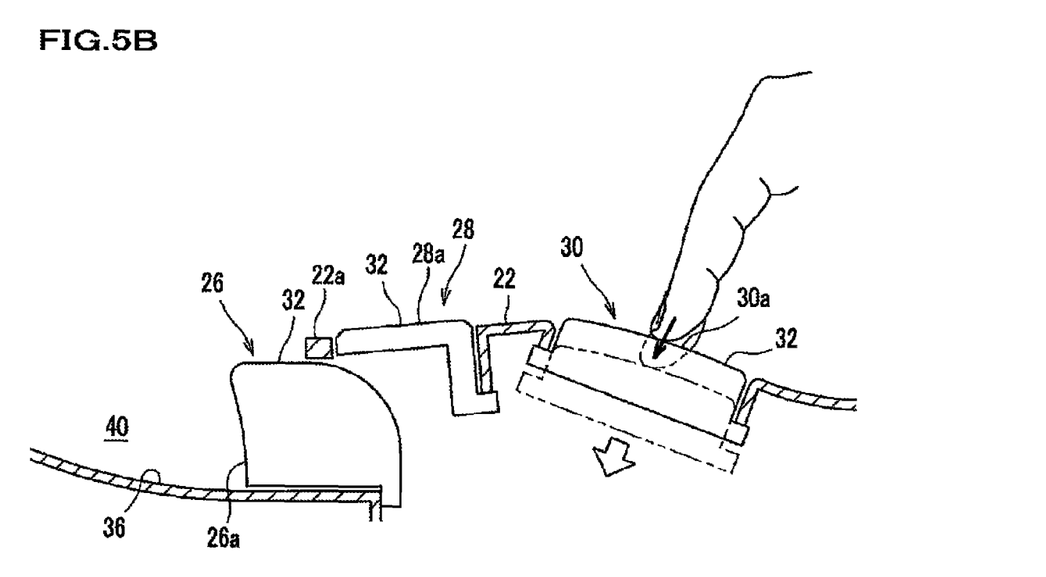
FIG. 5B is an explanatory view illustrating a state in which an operation face of a D-switch operation unit is pressed with a finger.

FIG. 5A is an explanatory view illustrating a state in which an operation face of an R-switch operation unit is pressed with a finger, and FIG. 5B is an explanatory view illustrating a state in which an operation face of a D-switch operation unit is pressed with a finger.

As illustrated in comparison of FIG. 5A with FIG. 5B, an action to press the push button 32 of the R-switch operation unit 26 is basically different from an action to press the push button 32 of the P-switch operation unit 24, the N switch operation unit 28 and the D-switch operation unit 30.

More specifically, the action to press the push button 32 of the P-switch operation unit 24, the N switch operation unit 28 and the D-switch operation unit 30 is, for example, an action in which the driver touches the push button 32 with a fingertip and then the push button 32 is pushed along a direction (extension) of the fingertip (see FIG. 5B). Unlike this, the action to press the push button 32 of the R-switch operation unit 26 is, for example, an action in which the fingertip is folded (flexed) at the second joint of the finger as the origination toward the push button 32 side (see FIG. 5A). Note that the action to press the push button 32 of the R-switch operation unit 26 is not an action with only the fingertip, but may be an action in which the whole hand is displaced toward the back side of the vehicle 12 to press the push button 32.

Thus, the difference in actions of the finger with which the push button 32 is pressed makes a touch (operation feeling) with which the driver presses the push button 32 with the fingertip, different between the R-switch operation unit 26 and the other switch operation units 24, 28 and 30 except for the R-switch operation unit 26, thereby making it possible to attain differentiation of the operations.

Furthermore, the shift device 10 includes the panel face 22 that is arranged on the vehicle body and is a surface of the cover member 20 on which each of the switch operation units 24, 26, 28 and 30 is arranged. In this panel face 22, a face on which the R-switch operation unit 26 is arranged and a face on which the D-switch operation unit 30 is arranged are arranged toward directions facing each other and slope relative to a face on which the N-switch operation unit 28 is arranged.

Furthermore, the panel face 22 has a recessed portion 40 which is positioned between the P-switch operation unit 24 on the front side of the vehicle 12 and the N-switch operation unit 28 on the back side of the vehicle 12 and is formed to be recessed from the surface thereof toward the inside. The R-switch operation unit 26 is arranged in a step portion 42 between a bottom surface 40a forming the recessed portion 40 and the surface 22a (see FIG. 4).

Furthermore, the step portion 42 is provided on the N-switch operation unit 28 side of the recessed portion 40, and the recessed portion 40 has a sloped face 36 which slopes from the P-switch operation unit 24 toward the R-switch operation unit 26. The sloped face 36 is formed so that the depth thereof from the surface 22a gradually becomes deep from the P-switch operation unit 24 toward the R-switch operation unit 26.

As shown in FIG. 3, the operation face 26a of the R-switch operation unit 26 when selecting the reverse range is arranged in a direction hidden from view when the panel face 22 is viewed in front. To be more specific, the operation face 26a of the R-switch operation unit 26 when selecting the reverse range is provided on a longitudinal wall 44 of the push button 32, which faces the sloped face 36. When the panel face 22 is viewed in section, the operation face 26a is set to be in a direction in which a distance D from a virtual vertical plane 46 in contact with an upside ridge line 44a of the longitudinal wall 44 gradually increases from an upside of the longitudinal wall 44 toward a downside thereof.

In this case, on the upside ridge line 44a of the longitudinal wall 44, the virtual vertical plane 46 and the upside ridge line 44a come into contact with each other to make the distance D from the virtual vertical plane 46 zero, and on the other hand, the distance D is set to gradually increase toward the downside of the longitudinal wall 44. Accordingly, when the panel face 22 is viewed from the front, the upside ridge line 44a of the longitudinal wall 44 becomes an obstacle (hindrance) to make it difficult to have visual contact with the operation face 26a (see FIG. 3). For this point, a description will be given later.

In the up-down direction of the panel face 22, an operation face 24a of the P-switch operation unit 24 is set at a position which is lower than operation faces 28a and 30a of the N-switch operation unit 28 and the D-switch operation unit and continues on the front of the vehicle 12 from the recessed portion 40 (see FIG. 3). For example, when performing a blind operation, the driver can easily grasp a positional relation of the P-switch operation unit 24 with the recessed portion 40 as the reference and simply operate the push button 32 of the P-switch operation unit 24 which is provided at the position on the front of the vehicle 12 and corresponding to the highest position of the sloped face 36.

Moreover, the center of the operation face 28a of the N-switch operation unit 28 and the center of the operation face 30a of the D-switch operation unit 30 are set to be roughly the same in height in the up-down direction of the panel face 22, respectively. The operation face 28a of the N-switch operation unit 28 is set to slope with a descent by a predetermined angle (gradient descending toward the front) toward the front side of the vehicle 12, and the operation face 30a of the D-switch operation unit 30 is set to slope with a descent by a sloped angle (gradient ascending toward the front) greater than a sloped angle of the N-switch operation unit 28 toward the opposite back side of the vehicle 12 (toward the driver side) (see FIG. 3). In this case, the operation face 30a of the D-switch operation unit 30 is sloped toward the back side of the vehicle 12 to be able to face the operation face 26a of the R-switch operation unit 26, as described later.

The driver can easily discriminate between the N-switch operation unit 28 and the D-switch operation unit 30 because the directions of slope of the operation faces 28a and 30a differ from each other, and thus the push button 32 can be suppressed from being wrongly pressed. Moreover, the operation face 30a of the D-switch operation unit 30 whose frequency of use is relatively high among the switch operation units 24, 26, 28 and 30 is arranged with a slope toward the driver side, thereby making the push button 32 of the D-switch operation unit 30 relatively easy to be pressed and making it possible to improve the operability.

Note that the operation face 30a of the D-switch operation unit 30 is formed to be in a circular shape, and on the other hand, the operation face 24a of the P-switch operation unit 24, the operation face 26a of the R-switch operation unit 26 and the operation face 28a of the N-switch operation unit 28 are formed to be in a rectangular shape, respectively (see FIG. 2).

Furthermore, an electric parking brake switch 48 is provided on the back side of the vehicle 12, of the D-switch operation unit 30 (see FIG. 2). The electric parking brake switch 48 is comprised of a well-known switch. For example, a parking brake is activated by pulling up a switch button while depressing a brake pedal (not shown), and on the other hand, the parking brake is released by pushing the switch button while depressing the brake pedal (not shown) to return to the former state.

The shift device 10 according to the present embodiment is basically configured as described above, and operations and effects thereof will be described below.

In the present embodiment, each of the switch operation units 24, 26, 28 and 30 is provided so that the direction of operation of the R-switch operation unit 26 corresponding to the reverse range is set to be a direction different from the directions of operation of the other switch operation units 24, 28 and 30 when selecting a range other than the reverse range. Accordingly, when the driver intends to select, for example, the drive range or the neutral range, even if the driver attempts to wrongly operate the R-switch operation unit 26 (to operate the N-switch operation unit 28 or the D-switch operation unit 30), the R-switch operation unit 26 can be suppressed from being operated because the direction of operation thereof differs from that of the N-switch operation unit 28 or the D-switch operation unit 30.

Consequently, in the present embodiment, even if the driver performs a blind operation, the driver can easily recognize from the difference between the directions of operation whether or not the R-switch operation unit 26 is operated, thereby making it possible to suppress disadvantage in that the driver wrongly selects the reverse range to impair comfort and operability.

Moreover, in the present embodiment, in order for the driver to perform operation of the R-switch operation unit 26, the operation is performed in a direction nearly perpendicular to the directions of operation when operating the other switch operation units 24, 28 and 30 except for the R-switch operation unit 26, or with a different angle of a right angle or more relative to the directions of operation of the other switch operation units 24, 28 and 30. Accordingly, for example, at a time of blind operation, even if the driver attempts to operate the R-switch operation unit 26 in the directions of operation corresponding to the other switch operation units 24, 28 and 30 (in the direction in which the push button 32 is pressed downward from above) with an intention to operate the other switch operation units 24, 28 and 30, the R-switch operation unit 26 cannot be operated and thus operability can be further improved.

Moreover, in the present embodiment, since the R-switch operation unit 26 is operated toward the back in the front-back direction of the vehicle to select the reverse range, a direction of behavior (backward travel direction) of the vehicle 12 intended by the driver becomes identical to the direction of operation of the R-switch operation unit 26, thereby making it possible for the driver to operate intuitively and thus to improve the operability.

Furthermore, in the present embodiment, the directions of operation of the other switch operation units 24, 28 and 30 when selecting a range other than the reverse range are in a direction in which the push button 32 is pressed toward the vehicle body to be in a direction away from the driver, and on the other hand, the direction of operation of the R-switch operation unit 26 is in a direction in which the push button 32 is pressed toward the back of the vehicle and pulled in toward the driver side to be in a direction toward the driver side. Consequently, in the present embodiment, even in the case where the driver, for example, performs a blind operation or wrongly touches the shift device 10, the driver is free from experiencing discomfort feeling because the R-switch operation unit 26 is not operated at all.

Furthermore, in the present embodiment, the face on which the R-switch operation unit 26 is arranged, and the face on which the D-switch operation unit 30 is arranged, are arranged stepping over the N-switch operation unit 28, toward the directions facing each other. Moreover, the face on which the R-switch operation unit 26 is arranged, and the face on which the D-switch operation unit 30 is arranged, slope relative to the face on which the N-switch operation unit 28 is arranged.

Accordingly, the driver never wrongly presses the R-switch operation unit 26 and the D-switch operation unit 30 and thus the operability can be improved.

Furthermore, in the present embodiment, the driver needs to put a hand in the recessed portion 40 and further in this state to operate the R-switch operation unit 26. Accordingly, even in the case where the driver wrongly touches the shift device 10, the driver is free from experiencing discomfort feeling because only the touch with the bottom surface 40a of the recessed portion 40 does not cause the R-switch operation unit 26 to be operated.

Furthermore, in the present embodiment, since the switch operation units 24, 26, 28 and 30 are arranged in the order of P, R, N and D to thereby make the shift positions the same as those in a conventional lever-type shift device, the driver can easily grasp the arrangement (positional relationship) of the switch operation units 24, 26, 28 and 30. In addition, in the present embodiment, since the sloped face 36 toward the R-switch operation unit 26 is provided, for example, at a time of blind operation, the driver puts a finger in the recessed portion 40 to move the hand along the sloped face 36 to the R-switch operation unit 26 side, thereby allowing the finger to be guided to the R-switch operation unit 26. Thus, the driver can easily grasp the position of the R-switch operation unit 26 with the recessed portion 40 as a reference and simply operate the R-switch operation unit 26 with the sloped face 36 as a guide face. Accordingly, the shift device excels in its operability.

Furthermore, in the present embodiment, the operation face 26a of the R-switch operation unit 26 is set to be in a direction in which the distance D from the virtual vertical plane 46 in contact with the upside ridge line 44a of the longitudinal wall 44 gradually increases from the upside of the longitudinal wall 44 toward the downside thereof, and accordingly, when the panel face 22 is viewed in front, the upside ridge line 44a of the longitudinal wall 44 becomes an obstacle (hindrance) to make it difficult to have visual contact with the operation face 26a. In other words, when the panel face 22 on which each of the switch operation units 24, 26, 28 and 30 is arranged is viewed in front, the operation face 26a of the R-switch operation unit 26 is arranged in a direction hidden from view. Consequently, for example, at a time of blind operation or at a time of unintended touch with the shift device 10, the driver is free from experiencing discomfort feeling because the R-switch operation unit 26 is not wrongly operated.

REFERENCE SIGNS LIST

10 Shift device
12 Vehicle
22 Panel face
24 P-switch operation unit
26 R-switch operation unit
26a Operation face of R-switch operation unit
28 N-switch operation unit
30 D-switch operation unit
32 Push button
36 Sloped face
40 Recessed portion
42 Step portion
44 Longitudinal wall
44a Upside ridge line
46 Virtual vertical plane
D Distance

The invention claimed is:

1. A shift device for a vehicle, having selection options including at least a drive option, a neutral option , and a reverse option, and provided to enable each option to be switched based on operation of switch operation units by a driver with each of the selection options associated with a corresponding switch operation unit of the switch operation units, wherein
the switch operation units comprises: a D-switch operation unit corresponding to the drive option; an N-switch operation unit corresponding to the neutral option; and an R-switch operation unit corresponding to the reverse option ,
a direction of operation of the R-switch operation unit when selecting the reverse option is in a direction which faces in a front-back direction of the vehicle and is different from a direction of operation of the D-switch operation unit when selecting the drive option,
each of the switch operation units has a push button.

2. The shift device for a vehicle, according to claim 1, wherein each of the switch operation units is provided so that the direction of operation of the R-switch operation unit when selecting the reverse option is set to be in a direction nearly perpendicular to the directions of operation of the switch operation units other than the R-switch operation unit when selecting a option other than the reverse option, or so that each other's directions of operation intersect such that an angle between the each other's directions of operation is a right angle or more.

3. The shift device for a vehicle, according to claim 1, wherein the R-switch operation unit is operated toward a back direction with respect to the front-back direction of the vehicle to select the reverse range.

4. The shift device for a vehicle, according to claim 1, wherein
the directions of operation of the switch operation units other than the R-switch operation unit are in a direction away from the driver, and
the direction of operation of the R-switch operation unit is in a direction toward the driver side.

5. The shift device for a vehicle, according to claim 1, further comprising a panel face which is arranged on a vehicle body and on which each of the switch operation units is arranged, wherein
in the panel face, a face on which the R-switch operation unit is arranged, and a face on which the D-switch operation unit is arranged, are arranged toward directions facing each other and slope relative to a face on which the N-switch operation unit is arranged.

6. The shift device for a vehicle, according to claim 1, further comprising a panel face which is arranged on a vehicle body and on which each of the switch operation units is arranged, wherein
the switch operation units other than the R-switch operation unit are arranged on a surface of the panel face;
the panel face has a recessed portion which is recessed from the surface toward the inside; and
the R-switch operation unit is arranged between a bottom surface forming the recessed portion and the surface.

7. The shift device for a vehicle, according to claim 6, wherein
each of the switch operation units is constituted by a push button;
the switch operation units further comprises a P-switch operation unit corresponding to a parking option;
the P-switch operation unit, the R-switch operation unit, the N-switch operation unit and the D-switch operation unit are arranged in this order on the panel face along a front-back direction of the vehicle;
the step portion is provided on the N-switch operation unit side of the recessed portion; and
the recessed portion has a sloped face which slopes from the P-switch operation unit toward the R-switch operation unit.

8. The shift device for a vehicle, according to claim 7, wherein
an operation face of the R-switch operation unit when selecting the reverse option is provided on a longitudinal wall of the push button, which faces the sloped face, and
when the panel face is viewed in section, the operation face is set to be in a direction in which a distance from a virtual vertical plane in contact with an upside ridge line of the longitudinal wall gradually increases from an upside of the longitudinal wall toward a downside thereof.

9. The shift device for a vehicle, according to claim 1, further comprising a panel face which is arranged on a vehicle body and on which each of the switch operation units is arranged, wherein
in the panel face, a face on which the R-switch operation unit is arranged, and a face on which the D-switch operation unit is arranged, are arranged toward directions facing each other.

10. The shift device for a vehicle, according to claim 1, further comprising a panel face which is arranged on a vehicle body and on which each of the switch operation units is arranged, wherein
in the panel face, a face on which the R-switch operation unit is arranged, or a face on which the D-switch operation unit is arranged, slopes relative to a face on which the N-switch operation unit is arranged.

11. A shift device for a vehicle, having selection options including at least a drive option and a reverse option, and provided to enable each option to be switched based on operation of switch operation units by a driver with each of the selection options associated with a corresponding switch operation unit of the switch operation units, wherein
the switch operation units comprises: a D-switch operation unit corresponding to the drive option; and an R-switch operation unit corresponding to the reverse option, and
the shift device comprises a panel face which is arranged on a vehicle body and on which each of the switch operation units is arranged, wherein
at least a part of an operation face of the R-switch operation unit is arranged on an inner side of the panel face farther than an operation face of each of switch operation units other than the R-switch operation unit, and
the R-switch operation unit is arranged on a bottom surface of the panel face.

12. A shift device for a vehicle, having selection options including at least a drive option, a neutral option and a reverse option, and provided to enable each option to be switched based on operation of switch operation units by a driver with each of the selection options associated with a corresponding switch operation unit of the switching operation units, wherein
each of the switch operation units is constituted by a push button,
the switch operation units comprises: a D-switch operation unit corresponding to the drive option; an N-switch operation unit corresponding to the neutral option; and an R-switch operation unit corresponding to the reverse option, and
a first line, corresponding to a direction of operation of the R-switch operation unit intersects a second line, corresponding to a direction of operation of the N-switch operation unit.

13. The shift device for a vehicle, according to claim 12, further comprising a parking option, wherein
the switch operation units comprises a P-switch operation unit corresponding to the parking option, and
the P-switch operation unit is arranged farther away from the R-switch operation unit than the N-switch operation unit.

14. The shift device for a vehicle, according to claim 12, wherein
a character representing each of switch operation units other than the R-switch operation unit is provided on an operation face of each of the switch operation units, and
a character representing the R-switch operation unit is provided at a position away from an operation face of the R-switch operation unit.

15. A shift device for a vehicle, having selection options including at least a drive option and a reverse option, and provided to enable each option to be switched based on operation of switch operation units by a driver with each of the selection options associated with a corresponding switch operation unit of the switch operation units, wherein
the switch operation units comprises: a D-switch operation unit corresponding to the drive option; an R-switch operation unit corresponding to the reverse option; and a P-switch operation unit corresponding to a parking option, and
the shift device comprises a panel face which is arranged on a vehicle body and on which each of the switch operation units is arranged, wherein
the panel face has a recessed portion which is recessed from a surface thereof toward the inside;
the R-switch operation unit is arranged in a step portion between a bottom surface forming the recessed portion and the surface; and
the recessed portion has a sloped face which slopes from the P-switch operation unit toward the R-switch operation unit.

* * * * *